Patented Dec. 4, 1951

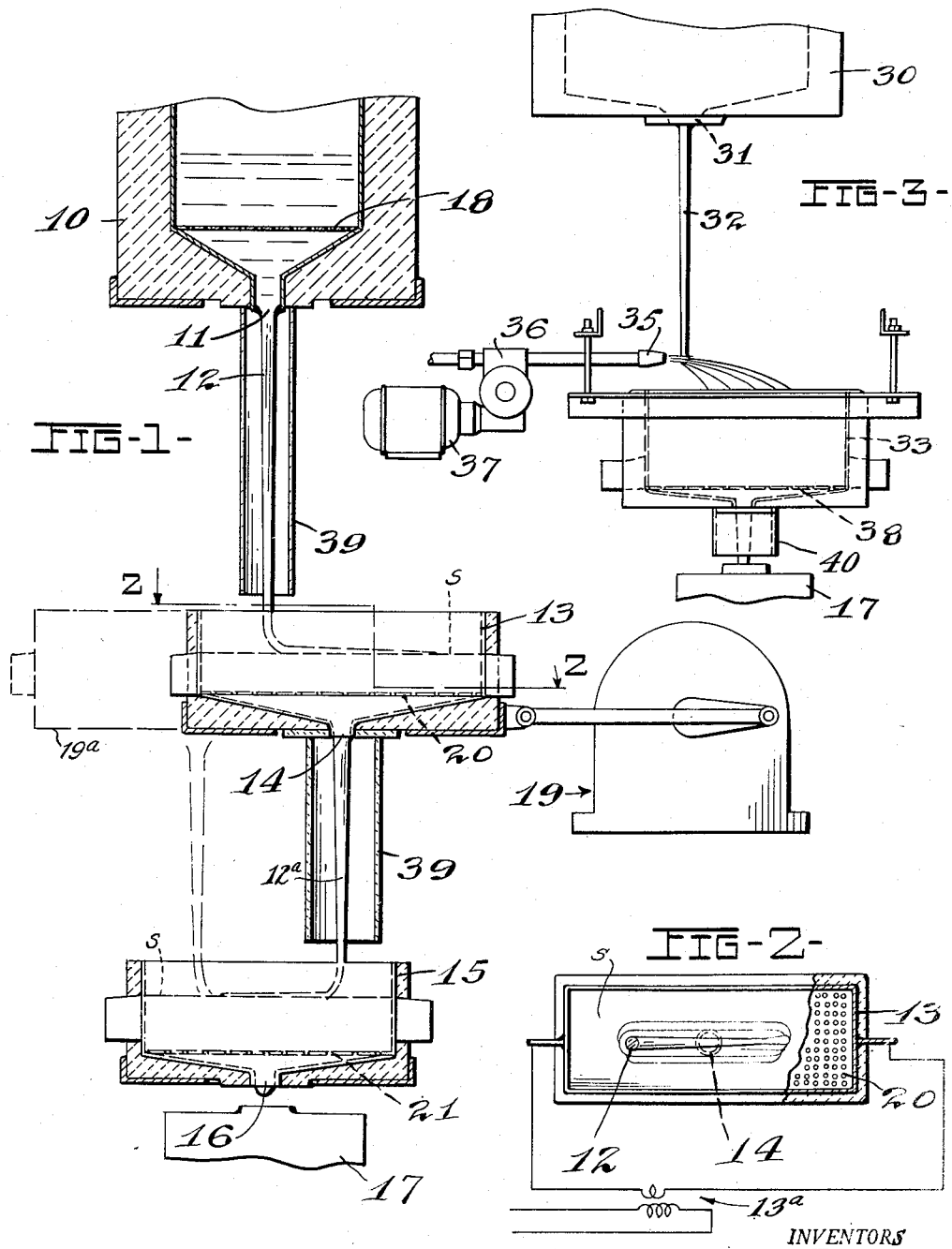

2,577,213

UNITED STATES PATENT OFFICE 2,577,213

METHOD AND APPARATUS FOR MIXING GLASS

Games Slayter and Ed Fletcher, Newark, Ohio, assignors to Owens-Corning Fiberglas Corporation, Toledo, Ohio, a corporation of Delaware Application May 14, 1945, Serial No. 593,682

10 Claims. (Cl. 259—17)

This invention relates to the manufacture of glass and refers more particularly to an improved method and apparatus for mixing glass.

The quality or performance characteristics of many glass products depends to a great extent on the uniformity or homogeneity of the glass employed in producing these products. Thus considerable attention must be given to the mixing of molten glass before processing or fabricating the latter into such products. Exhaustive experimental work in this particular field indicates that a pool of molten glass may contain non-homogeneous bodies of glass which circulate without dissolving in the pool. These ambient bodies may result from refractory stones, unmelted batch particles or clumps or cord masses each of which produces non-uniformities in the molten body. These non-uniform portions differ in composition from the matrix body so that a highly inhomogeneous mixture results in which different regions have higher concentrations of certain batch ingredients than others. Thus, in a forehearth, the molten glass in the region adjacent the delivery end of the forehearth may be of a different composition than the molten glass in the rear regions of the forehearth.

In an attempt to overcome these non-uniformities, it has been proposed to mechanically stir the glass by employing a stirrer resembling a large rake which was moved back and forth through the molten glass. This type of stirrer mixes on an overall or grand scale in that it moves the molten glass from one area of the pool into widely removed portions of the pool. It will, of course, be understood that the above type of stirring also strings out or disrupts, to a limited extent, small localized non-uniformities such as cords in the glass and, as a consequence, may be said to perform some small scale mixing. This type of stirrer has achieved only very restricted use, however, because it not only fails in mixing the molten glass to the extent required to obtain the desired homogeneity of the glass but, in addition, entails rather complicated mechanisms that must operate at elevated temperatures. Also moving the highly viscous body requires the expenditure of considerable power which must be accounted for in the cost of producing the glass.

One of the principal objects of this invention is to overcome the shortcomings of the above apparatus by employing an arrangement wherein the non-uniformities in localized portions or in small volumes of the molten glass are more thoroughly mixed.

One instance where the use of a glass having high homogeneity characteristics is advantageous is in the production of glass fibers or filaments from a body of molten glass. The molten glass is usually contained in a feeder having a multiplicity of small orifices at the bottom through which glass flows in the form of streams. The streams are usually attenuated at some point below the feeder so as to form filaments of very small diameter.

In carrying out the above process, this invention provides for supplying glass to the feeder which has been mixed in a manner to insure that all stria, cords or any other non-uniformities if not entirely dissipated are attenuated to such small size and so uniformly distributed throughout the body of molten glass that they become inconsequential. When the glass so mixed is made into marbles or other cullet for introduction into a feeder for further fabrication, every marble will be of substantially the same composition.

One method by which the supply body of molten glass may be mixed and to which method the present invention is particularly directed comprises flowing the glass in a thin stream which tends to orient any cords therein parallel to the direction of flow of the stream. The stream is then caused to fold back and forth upon itself in a direction normal to its flow at the source and from this reoriented position it may be segregated into small units by suitable means which break the cords into short lengths. Further downward flow of the glass causes the shortened cords to again be attenuated to a greatly reduced length and diameter. As a result, the glass at each orifice in the feeder will be of the same viscosity and the fibers attenuated from the streams at each orifice will be uniform. Moreover, uniformity of the molten glass within all portions of the feeder minimizes interruption of attenuation at some of the orifices so that the number of interruptions in production are greatly reduced.

The attenuation of cords or other non-uniformities in the flowing stream is augmented by the distance through which the hot stream is permitted to fall of its own accord. This is due both to the temperature and viscosity of the glass and the effect of surface tension on the stream. The fall of the stream by gravity after leaving an orifice increases in velocity of flow with a consequent reduction in the cross-sectional area of the stream. Portions of cord masses in the slower moving body upon approaching the region of accelerated flow are engaged by the faster moving stream. This tends to draw out the cords from the slower moving body due to the relative difference in speed of movement of the bodies.

This method of flowing glass differs widely from flowing a body through a channel or over a dam in which instances the glass remains in frictional contact with the walls of the container and tends to move at a more uniform rate throughout the entire body. In such instances there is no relative movement between areas within the body which would effect attenuation of any non-uniformities therein.

A further object of this invention is to mix the molten glass by drawing or drafting out any non-uniformities such as cords or striae so that the latter are reduced to a diameter sufficiently less than the diameter of the feeder orifices to enable free passage of the stria therethrough.

The foregoing as well as other objects will be made more apparent as this description proceeds, especially when considered in connection with the accompanying drawing, wherein:

Figure 1 is a diagrammatic sectional elevational view of one type of apparatus that may be employed to mix molten glass in accordance with this invention;

Figure 2 is a sectional view taken substantially on the plane indicated by the line 2—2 of Figure 1; and Figure 3 is a diagrammatic view of a modified form of apparatus.

Referring first generally to the embodiment of the invention shown in Figures 1 and 2, it will be noted that the reference character 10 indicates a furnace forehearth or feeder adapted to contain a supply body of molten glass and having a discharge orifice 11 at the bottom through which molten glass flows in the form of a stream 12. Suitably supported directly below the orifice 11 in a position to receive the flowing stream 12, is a substantially rectangular reciprocating container 13 having a discharge opening 14 at the bottom through which the molten glass again flows in the form of a thin stream 12a to a second bushing 15. The bushing 15 also rectangular in shape is supported directly below the container 13 and is formed with a discharge opening 16 at the bottom for discharging the molten glass into a device 17, which may comprise any suitable processing equipment. In the present instance, however, the device 17 forms the molten glass into briquettes or marbles which are subsequently used in the production of glass fibers or filaments.

During passage of the molten glass from the feeder 10 to the device 17, the glass is thoroughly mixed so that all portions of the glass admitted to the device 17 are of substantially the same composition and so that any non-uniformities existing in the glass, such as striae and cords are not only reduced to an infinitesimal size but are also uniformly distributed. This may be accomplished in part by a foraminous plate or screen 18 supported in the feeder orifice 11 in a position to cause the molten glass to pass therethrough. The screen thus subdivides the glass into a multiplicity of very fine streams so that any cords at this point are at least no larger than the screen openings. The fine streams recombine into the single stream 12 as it flows toward the container 13. This action mixes the molten glass on what may be considered a small scale and assists in reducing the non-uniformities in small volumes of the glass. As shown in Figure 1, it will be noted that the container 13 is spaced a sufficient distance from the feeder 10 to enable the cross-sectional area of the stream of molten glass to gradually reduce so that any cords existing in the molten glass are thus strung out parallel to the direction of flow of the stream.

In the present instance, the container 13 is moved back and forth transversely of the direction of flow of the stream 12 by a motor driven eccentric 19. As the container is translated by the eccentric 19 to the position shown in broken lines 19a (Figure 1), the streams of molten glass 12 and 12a are folded and refolded upon themselves on the surface S of the glass in the bushings 13 and 15. In this manner the stream is laid in a direction transversely of the elongation of the cords by the stream 12, that is, in a horizontal plane. From this position the cords are again disrupted and elongated at substantially right angles to their horizontal positions in the container 13 by flowing the molten glass through a screen or perforated plate 20 arranged to cause the molten glass to flow therethrough as it passes to the discharge opening 14 at the bottom of the container. It is pointed out at this time that the container 13 is preferably heated electrically so as to maintain the glass at the required temperature. This may be accomplished as typically illustrated in Figure 2 by electrically connecting the bushing in series with the secondary coil of a transformer 13a, the primary coil being connected in series with a suitable source of power.

The bushing 15 is also preferably supported a sufficient distance below the container 13 to enable the stream of molten glass to "neck in" due to surface tension as it flows between the container and bushing. As a result of the transverse movement of the cords through the screen 20, the thus shortened cord formations are further elongated. Inasmuch as the bushing 15 is stationarily mounted, it will be noted that the stream 12a of molten glass entering this bushing is also folded and refolded upon itself by the movement of the container 13. With this folding, the molten glass stream is again disposed in a direction transverse to that of the flowing stream and any cords remaining in the glass are once more arranged in horizontal planes in the bushing 15.

The bushing 15 is also provided with a screen or a perforated plate 21 to further disrupt the glass formation and through which the glass flows to the orifices 16. As the molten glass passes through the screen 21, any residual or fragmentary cords are again elongated at right angles to the horizontal positions of the cords in the bushing and, as a result, the molten glass discharged to the device 17 is completely and thoroughly mixed.

While the amount of mixing provided by the apparatus just described is ordinarily sufficient to completely homogenize the glass, certain uncontrollable conditions may at times prevail by reason of which small cords or other non-uniformities are impossible to completely remove. In and event, the molten glass is so thoroughly mixed during its passage from the feeder 10 to the device 17 that each marble or briquette formed by the device 17 will contain glass of the same composition and any non-uniformities existing in the glass will not only be uniformly distributed throughout the marble or briquette, but in addition, will be so small that they will readily pass through the orifices in a fiber forming bushing or feeder.

The embodiment of the invention shown in

Figure 3 differs principally from the above construction in that the reciprocating container has been eliminated. In the present form a glass supply container 30 is provided with an orifice 31 for flowing a stream 32 of glass which is permitted to drop by gravity and neck in to a relatively small diameter. The stream is caught in an electrically heated rectangular feeder bushing 33 which is arranged with one end in the path of flow of the stream. The stream is periodically displaced longitudinally of the bushing 33 by an impinging jet of air so that it is folded back and forth upon itself in the bushing.

In detail, a nozzle 35 is supported to one side of the path of travel of the stream 32 directly above the bushing 33 and communicates with a source of air under pressure through a rotary valve 36, which is operated by a motor 37. The valve 36 is successively opened and closed to periodically discharge air under pressure against one side of the stream 32. As a result, the stream is intermittently shifted laterally. This has the effect of folding and refolding the glass stream in the bushing 33 and not only elongates the cords at right angles to the normal path of travel of the stream but, in addition, arranges the cords in the bushing 33 in horizontal planes. The nozzle 35 may be adjusted vertically to control the length of the folds of the stream in the bushing.

A screen 38 in the bushing 33 operates to subdivide the glass at right angles to the horizontal position in which the stream is laid. This breaks up and attenuates the cords into very short lengths of small diameter. The greater the distance between the supply container 30 and the bushing 33 the higher the degree of primary attenuations so that the cords are of small diameter when they reach the bushing. In the present instance, the molten glass is discharged from the bushing 33 directly into the device 17.

Both embodiments of the invention previously described serve the purpose of mixing the molten glass on what may be considered a small scale by stringing out any cords that may exist in the glass and also serve to mix the molten glass on an overall scale by laying the stream of molten glass in the bushings in layers extending substantially in horizontal planes. Also provision may be made in either or both embodiments of this invention to confine the glass streams in heat resistant tubes indicated in Figures 1 and 3 by the reference characters 39 and 40 respectively. In Figure 3, it is preferred to restrict the application of the tube to the stream flowing from the bushing 33 to the device 17 so as not to interfere with deflection of the glass stream above the bushing 33 by the nozzle 35. In any case, the heat resistant tubes will serve to eliminate losses of volatile constituents of the glass and to prevent the creation of non-uniformities from this source.

Modifications may be resorted to within the spirit of the invention and the scope of the claims.

We claim:

1. Apparatus for mixing molten glass comprising means for flowing a stream of glass from a molten body thereof, a bushing for collecting the stream flowing from said body of glass, means intermedially of said bushing and said body of glass for relatively shifting the stream in opposite directions laterally with respect to the normal path of the stream, said shifting drawing out any cords existing in the molten glass and arranging the cords in the bushing in planes extending transversely to the normal path of the stream, and means for comminuting the transversely arranged cords in the glass intermedially of their length.

2. Apparatus for mixing molten glass comprising means for flowing a stream of glass from a molten body thereof, a bushing for collecting the stream flowing from said body of glass, means intermedially of said bushing and said body of glass for relatively shifting the stream in opposite directions laterally with respect to the normal path of the stream to lay the stream horizontally in the bushing, and means for breaking up any cords existing in the stream of glass by directing the flow thereof at substantially right angles to the horizontal planes of the cords uniformly throughout the length of said bushing.

3. Apparatus for mixing molten glass comprising means for flowing a stream of glass from a molten body thereof, a bushing for collecting the stream flowing from said body of glass, a second bushing for receiving the glass as it flows from said first bushing, means for reciprocating said first named bushing transversely of the stream to draw-out any cords existing in the molten glass and to orient the cords in horizontal planes in said second bushing, and means for uniformly severing the cords as the glass flows downwardly through each said bushing.

4. Apparatus for mixing molten glass comprising means for flowing a stream of glass from a molten body thereof, a bushing for collecting the stream flowing from said body of glass, means for periodically deflecting the path of the stream of molten glass entering the bushing laterally with respect to the normal path of the stream to draw-out any cords existing in the molten glass and to arrange the cords in horizontal planes in said bushing, and means for uniformly severing the cords intermedially of their length as the glass flows downwardly through the bushing.

5. Apparatus for mixing molten glass comprising means for flowing a stream of glass from a molten body thereof, a bushing for collecting the stream flowing from said body of glass, means for periodically deflecting the stream of molten glass entering the bushing laterally with respect to the normal stream path to arrange any cords existing in the molten glass in horizontal planes in said bushing, and means for breaking up the cords into segments of short length.

6. Apparatus for mixing molten glass comprising means for flowing a stream of glass from a molten body thereof, a bushing for collecting the stream flowing from said body of glass, and means for periodically directing fluid under pressure against one side of the stream as it enters the bushing to deflect the stream laterally with respect to the normal path of flow of the stream to draw-out any cords existing in the molten glass and to orient the cords in horizontal planes in said bushing.

7. Apparatus for mixing molten glass comprising means for flowing a stream of glass from a molten body thereof, a stationary bushing for collecting the stream flowing from said body of glass, a movable bushing arranged between said stationary bushing and said body of glass, means for relatively shifting said movable bushing and stream in opposite directions laterally with respect to the normal path of the stream to draw-out any cords existing in the molten glass and to arrange the cords in horizontal planes in said stationary bushing, and a perforated plate in each said bushing for breaking up the cords intermediately of their length as the molten glass flows therethrough.

8. Apparatus for mixing molten glass comprising a feeder for flowing molten glass in the form of a stream, a bushing spaced below the feeder for collecting the molten glass in said stream, a second bushing between said feeder and said first named bushing and having an opening at the bottom through which molten glass is discharged in the form of a stream, means for relatively shifting said second bushing and portion of the stream at the entrant side of the bushing in opposite directions laterally with respect to the normal path of flow of the stream, said shifting drawing out any cords existing in the molten glass and orienting the cords in horizontal planes in the bushing, and a perforated plate supported in the bushing in a position to compel molten glass to pass through the perforations to the discharge opening whereby the cords are severed transversely of their length and further drawn-out in directions at substantially right angles to the horizontal planes of the cords in said bushing.

9. Apparatus for mixing molten glass comprising a feeder for flowing molten glass in the form of a stream, a bushing spaced below the feeder for collecting the molten glass in said stream and having an opening at the bottom through which molten glass is discharged in the form of a stream, means for controlling the pattern of the stream as it flows into the bushing a perforated plate supported in the bushing in a position to compel molten glass to pass through the perforations thereof to the discharge opening, and a heat resistant tube extending between the feeder and bushing through which the stream of molten glass from the feeder flows.

10. The method of mixing molten glass which comprises flowing a stream of molten glass throughout a distance sufficient to enable any cords existing in the glass to string-out as the stream becomes smaller in cross-sectional area, folding the thinned stream back and forth upon itself and collecting the molten streams in a pool to orient any cords therein in common parallel planes, and further elongating and severing the cords by flowing the glass from the pool in directions transverse to the planes of the cords and in a plurality of streams.

GAMES SLAYTER.
ED FLETCHER.

REFERENCES CITED

The following references are of record in the file of this patent:

UNITED STATES PATENTS

| Number | Name | Date |
|---|---|---|
| 930,086 | Reed | Aug. 3, 1909 |
| 1,618,290 | La France | Feb. 22, 1927 |
| 1,954,732 | Gossler | Apr. 10, 1934 |
| 1,986,575 | Honiss | Jan. 1, 1935 |
| 2,061,333 | Skinner | Nov. 17, 1936 |
| 2,159,361 | Atkinson et al. | May 23, 1939 |
| 2,411,031 | Deyrup | Nov. 12, 1946 |

FOREIGN PATENTS

| Number | Country | Date |
|---|---|---|
| 449,233 | Germany | Sept. 7, 1927 |
| 612,120 | France | July 24, 1926 |